(12) United States Patent
Kagata

(10) Patent No.: US 11,598,636 B2
(45) Date of Patent: Mar. 7, 2023

(54) LOCATION INFORMATION DISPLAY DEVICE AND SURVEYING SYSTEM

(71) Applicant: Topcon Corporation, Tokyo (JP)

(72) Inventor: Mitsutaka Kagata, Tokyo (JP)

(73) Assignee: Topcon Corporation, Tokyo (JP)

( * ) Notice: Subject to any disclaimer, the term of this patent is extended or adjusted under 35 U.S.C. 154(b) by 423 days.

(21) Appl. No.: 16/837,345

(22) Filed: Apr. 1, 2020

(65) Prior Publication Data
US 2020/0318964 A1 Oct. 8, 2020

(30) Foreign Application Priority Data
Apr. 2, 2019 (JP) .............................. JP2019-070520

(51) Int. Cl.
*G01C 15/00* (2006.01)
*G01S 17/86* (2020.01)
(Continued)

(52) U.S. Cl.
CPC ............ *G01C 15/002* (2013.01); *G01C 15/02* (2013.01); *G01S 17/42* (2013.01); *G01S 17/86* (2020.01);
(Continued)

(58) Field of Classification Search
CPC ...... G01C 15/002; G01C 15/02; G01C 15/00; G01S 17/42; G01S 17/86; G01S 17/89;
(Continued)

(56) References Cited

U.S. PATENT DOCUMENTS

| 7,861,423 B2 | 1/2011 | Kumagai et al. |
| 8,024,144 B2 * | 9/2011 | Kludas .................. G06T 3/0062 382/254 |

(Continued)

FOREIGN PATENT DOCUMENTS

| EP | 1293755 A1 * 3/2003 ............. G01C 15/00 |
| JP | 2009-229192 A   10/2009 |

(Continued)

OTHER PUBLICATIONS

Partial European Search Report (R. 64 EPC) dated Aug. 20, 2020, in connection with European Patent Application No. 20167753.1, 16 pgs.

*Primary Examiner* — Ryan R Yang
(74) *Attorney, Agent, or Firm* — Chiesa Shahinian & Giantomasi PC

(57) ABSTRACT

A head-mounted display device has more convenient functions, which is usable in, e.g., surveying. An eyeglass display device includes a display unit and an operation content receiving unit. The display unit is configured to be placed on the head of a user and to be viewed by the user. The operation content receiving unit receives content of operation performed by the user. The display unit displays an image that shows a location relationship between positioning information of a target positioned by a location measuring device by using laser light and a predetermined placement planned location of the target. Multiple coordinate systems are prepared for a coordinate system of the displayed image. The operation content receiving unit receives designation of one coordinate system from among the multiple coordinate systems by the user.

1 Claim, 7 Drawing Sheets

(51) Int. Cl.
*G01C 15/02* (2006.01)
*G01S 17/42* (2006.01)
*G01S 17/89* (2020.01)
*G02B 27/00* (2006.01)
*G02B 27/01* (2006.01)

(52) U.S. Cl.
CPC .......... *G01S 17/89* (2013.01); *G02B 27/0093* (2013.01); *G02B 27/0172* (2013.01); *G02B 2027/014* (2013.01); *G02B 2027/0141* (2013.01); *G02B 2027/0178* (2013.01)

(58) Field of Classification Search
CPC ............ G02B 27/0093; G02B 27/0172; G02B 2027/014; G02B 2027/0141; G02B 2027/0178
See application file for complete search history.

(56) References Cited

U.S. PATENT DOCUMENTS

| | | | |
|---|---|---|---|
| 11,378,398 B2* | 7/2022 | Hornung | G01C 15/002 |
| 2007/0257836 A1* | 11/2007 | Chaplin | G01S 13/867 |
| | | | 342/357.41 |
| 2009/0220144 A1* | 9/2009 | Mein | G01C 15/00 |
| | | | 382/154 |
| 2009/0235541 A1 | 9/2009 | Kumagai et al. | |
| 2012/0242830 A1 | 9/2012 | Kumagai et al. | |
| 2016/0328881 A1* | 11/2016 | Ozeki | G06F 1/163 |
| 2017/0356741 A1* | 12/2017 | Nishita | G01S 17/87 |

FOREIGN PATENT DOCUMENTS

| | | |
|---|---|---|
| JP | 2012-202821 A | 10/2012 |
| JP | 5124319 B | 1/2013 |
| JP | 2017-133981 A | 8/2017 |

* cited by examiner

Location of a reflection prism   Location of a survey setting point

Marker for location of a survey setting point

Location of the reflection prism 71

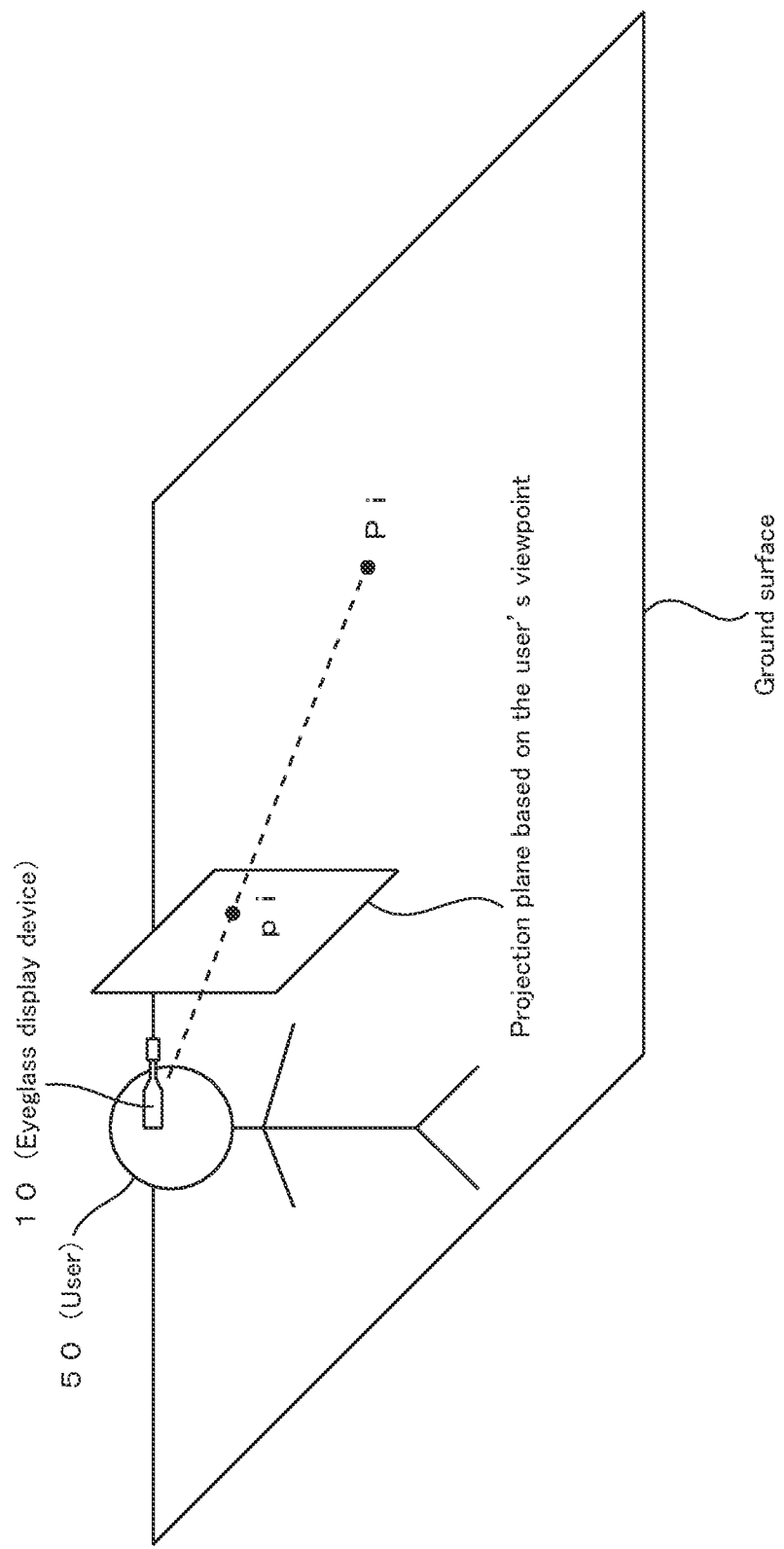

LOCATION INFORMATION DISPLAY DEVICE AND SURVEYING SYSTEM

BACKGROUND OF THE INVENTION

Technical Field

The present invention relates to a technique usable in, e.g., surveying.

Background Art

Japanese Unexamined Patent Application Laid-Open No. 2017-133981 discloses an eyeglass display device to be used in surveying. In this technique, information for guiding a user or an operator to a surveying location is displayed on the eyeglass display device, thereby preventing the line of sight of the user from wandering and allowing the user to use hands freely.

The technique disclosed in Japanese Unexamined Patent Application Laid-Open No. 2017-133981 does not fully use the features of the eyeglass display device that is used by placing it on the head of a user. Moreover, the technique disclosed in Japanese Unexamined Patent Application Laid-Open No. 2017-133981 does not sufficiently provide each function that is required in surveying.

SUMMARY OF THE INVENTION

In view of these circumstances, an object of the present invention is to provide a head-mounted display device having more convenient functions, which is usable in, e.g., surveying.

The present invention provides a location information display device including a display unit and an operation content receiving unit. The display unit is configured to be placed on the head of a user and to be viewed by the user. The operation content receiving unit receives content of operation performed by the user. The display unit displays an image that shows a location relationship between positioning information of a target positioned by a location measuring device by using laser light and a predetermined placement planned location of the target. Multiple coordinate systems are prepared for a coordinate system of the displayed image. The operation content receiving unit receives designation of one coordinate system from among the multiple coordinate systems by the user.

Another aspect of the present invention provides a location information display device including a display unit and an operation content receiving unit. The display unit is configured to be placed on the head of a user and to be viewed by the user. The operation content receiving unit receives content of operation performed by the user. The display unit displays an image that shows a location relationship between positioning information of a target positioned by a location measuring device by using laser light and a predetermined placement planned location of the target. The displayed image shows a figure representing accuracy of the placement planned location. The operation content receiving unit receives operation relating to change in the accuracy by the user.

Yet another aspect of the present invention provides a location information display device including a receiving unit, a display unit, a sensor, a GNSS location measuring unit, and an arithmetic operation unit. The receiving unit receives positioning information of a target positioned by a location measuring device by using laser light. The display unit is configured to be placed on the head of a user and to be viewed by the user. The sensor measures direction. The display unit displays an image that shows a direction and a distance of a predetermined placement planned location of the target, as viewed from a viewpoint of the user. The arithmetic operation unit calculates the direction and the distance of the placement planned location of the target based on the positioning information of the positioned target, information of the direction measured by the sensor, and information of location measured by the GNSS location measuring unit.

In the present invention, the arithmetic operation unit may perform one or both of calculation of exterior orientation parameters of the location information display device and calibration of the sensor for measuring the direction and the GNSS location measuring unit, based on positioning information of the location information display device that is measured by the location measuring device in a state in which a specific direction of the location information display device is directed to the location measuring device.

In the present invention, the location information display device may further include a sighting unit, and the specific direction of the location information display device may be directed to the location measuring device by sighting the location measuring device by the sighting unit.

In the present invention, the location information display device may further include a communication unit that sends information of direction from the location information display device to the location measuring device, to the location measuring device. The present invention can also be understood as a surveying system that is configured to calculate a direction of the location information display device as viewed from the location measuring device, based on the information of the direction from the location information display device to the location measuring device, sent from the location information display device.

Still yet another aspect of the present invention provides a location information display device including a receiving unit, a display unit, and a sensor. The receiving unit receives positioning information of a target positioned by a location measuring device by using laser light. The display unit is configured to be placed on the head of a user and to be viewed by the user. The sensor measures information relating to direction. Movement of the head of the user is measured by the sensor. At least one operation of the location information display device is performed through movement of the head.

In the present invention, the display unit preferably displays a projection plane that is set in front of the eyes of the user, and the placement planned location of the target is preferably displayed at a position on the projection plane at which a line connecting the viewpoint of the user and the placement planned location of the target intersects the projection plane. The present invention can also be understood as a surveying system including the location information display device described above. In this case, the location measuring device may position the target while capturing and locking on the target, and the locking may be maintained after the positioning is finished.

According to the present invention, a head-mounted display device having more convenient functions, which is usable in, e.g., surveying, is provided.

BRIEF DESCRIPTION OF DRAWINGS

FIG. 8 is a principle diagram showing a principle for generating a projection plane based on a user's viewpoint.

PREFERRED EMBODIMENTS OF THE INVENTION

1. First Embodiment

Overview

Figure 1:
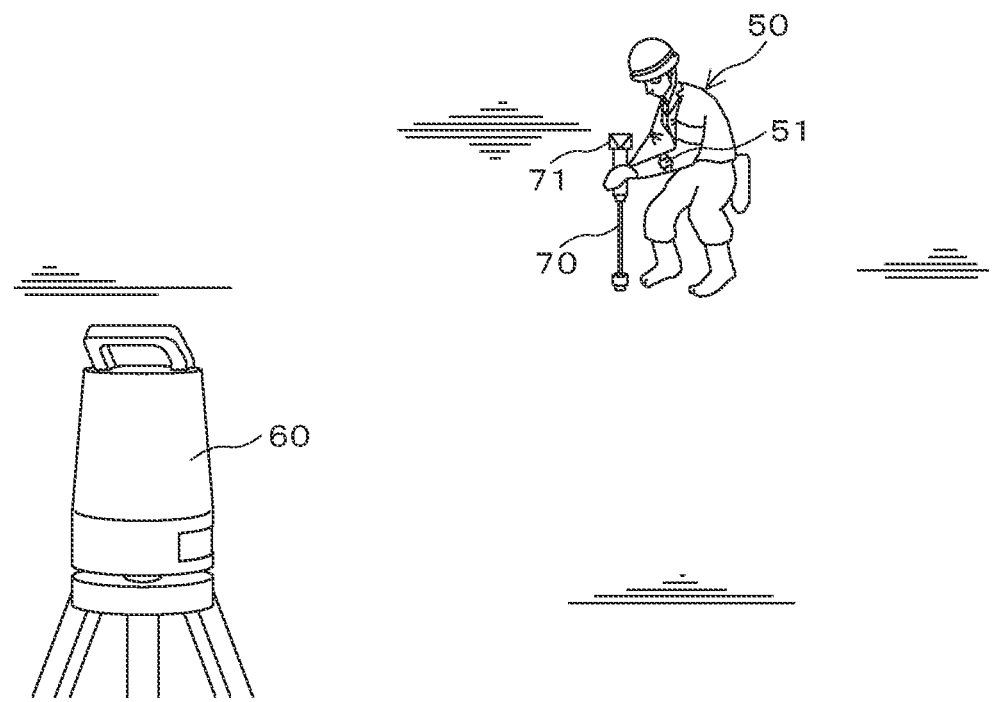
FIG. 1 is a schematic diagram showing an overview of surveying using the present invention.
Figure 2:
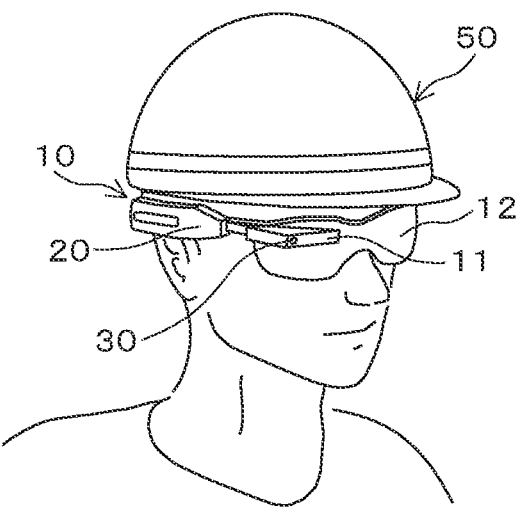
FIG. 2 shows an appearance of a display device of an embodiment placed on a head.

FIG. 1 shows a situation of setting a survey setting point. FIG. 2 shows a state in which a user 50 places an eyeglass display device 10 on the head. In the work for setting a survey setting point shown in FIG. 1, a user or an operator 50 identifies a survey setting point by using a surveying pole 70 provided with a reflection prism 71. In this work, a total station (TS) 60, which functions as a location measuring device, stores location data of survey setting points, and the user 50 is guided to the survey setting point by the eyeglass display device 10.

The eyeglass display device 10 is an example of a location information display device having a display unit to be viewed by a user who places the location information display device on the head. The eyeglass display device 10 displays an image for guiding the user 50 to a survey setting point, and the user 50 moves to the survey setting point while carrying the surveying pole 70 by hand, by viewing the displayed image. Then, the location of the reflection prism 71 that is placed on the survey setting point is measured by the TS 60, whereby the survey setting point is identified in the work site. Thereafter, a pile as a mark is driven at the identified survey setting point.

The TS 60 is a commercially available device and is configured to search for the reflection prism 71 by using laser light or performing image recognition processing on a photographic image obtained by a camera and to position the reflection prism 71 by using laser light. The TS 60 emits distance measuring laser light to the reflection prism 71 and measures the light reflected back from the reflection prism 71. The distance from the TS 60 to the point that reflects light, that is, to the reflection prism 71, is calculated from a propagation time of the distance measuring laser light or from a phase difference between the distance measuring laser light and reference light that propagates a reference optical path. The direction of the reflection prism 71 as viewed from the TS 60 is measured from the emission direction of the distance measuring laser light. As a result, the location of the reflection prism 71 relative to the TS 60 is calculated from the distance from the TS 60 to the reflection prism 71 and the direction of the reflection prism 71 as viewed from the TS 60. In the condition in which the location of the TS 60 in a specific coordinate system is known, the location of the reflection prism 71 in the specific coordinate system is determined. Techniques relating to the total station (TS) are disclosed in, for example, Japanese Unexamined Patent Applications Laid-Open Nos. 2009-229192 and 2012-202821 and Japanese Patent No. 5124319.

Eyeglass Display Device

The eyeglass display device 10 is an example of a head-mounted display device and includes a display 11, an eyeglass part 12, and a display controller 20. The eyeglass display device 10 is a wearable eyeglass terminal having an image display function. The eyeglass display device 10 is placed on the head of the user 50 as in the manner of eyeglasses. The eyeglass display device 10 includes the display 11 and the protective eyeglass part 12 formed of a visible light transmissive member.

The display 11 has an image display part using liquid crystal or organic electroluminescence (EL) at a part to be made to face one eye of the user 50. An image that is displayed on the image display part is virtually displayed at a position several tens of centimeters in front of the eyes of the user 50 to allow the user 50 to visually recognize it. The type of the display 11 is not limited, and a commercially available eyeglass wearable terminal can be used. Alternatively, an image display device that projects an image at the eyeglass part 12 or on a retina can also be used. Instead of the eyeglass device, a display device that is fitted to the head of the user 50 in another manner can also be used. The display 11 of this embodiment partially blocks the field of view of the user 50. However, a display image may be composed in the field of view of the user 50 to allow the user 50 to visually recognize a background view through the display image.

The display controller 20 generates an image to be displayed on the display 11 and outputs an image signal of the generated image to the display 11. The display controller 20 performs various kinds of measurements and arithmetic operations that are necessary to generate an image to be displayed on the display 11. A camera 30 is arranged behind a case that houses the display 11, in such a manner that an optical axis of the camera 30 is directed forward of the user 50. The camera 30 is configured to obtain a moving image in the front direction of the user 50.

The display controller 20 includes a communication unit 21, a storage 22, an arithmetic operation unit 23, a GPS unit 24, an acceleration sensor 25, a gyroscope sensor 26, an azimuth sensor 27, a display image generating unit 28, and an operation content receiving unit 29. The storage 22, the arithmetic operation unit 23, and the display image generating unit 28 are implemented by using functions of a computer.

The storage 22 may be embodied by using a semiconductor memory or a storage medium of each type. At least one of the arithmetic operation unit 23 and the display image generating unit 28 may be constituted of a dedicated processor, such as an electronic circuit that executes, e.g., transferring, calculating, processing, control, and management of data, which are described in a software program. At least one of the arithmetic operation unit 23 and the display image generating unit 28 can also be understood as a computer program that executes a corresponding function.

The communication unit 21, the GPS unit 24, the acceleration sensor 25, the gyroscope sensor 26, and the azimuth sensor 27 are constituted by using dedicated modules formed based on an integrated circuit technique or by integrated circuits (ICs). One or more components of the display controller 20 may be constituted of external units. Alternatively, one or more or all of the storage 22, the arithmetic operation unit 23, and the display image generating unit 28 may be implemented by a personal computer (PC) or a server.

The communication unit 21 makes a communication with the TS 60. The communication is performed by using Bluetooth (registered trademark), each type of wireless LAN standard, infrared communication, cellular phone line, other wireless line, or by other means. The communication destination is not limited to the TS 60 and may be, e.g., a smartphone, a personal computer (PC), or a server that is connected to an internet network.

The storage 22 uses an electronic memory and stores a program and data necessary to operate the eyeglass display device 10. The arithmetic operation unit 23 performs various kinds of arithmetic operations relating to operation of the eyeglass display device 10. The arithmetic operations of the arithmetic operation unit 23 will be detailed later. The program for executing the arithmetic operations is stored in the storage 22.

The GPS unit 24 measures a location of the display controller 20 by using a GNSS. The acceleration sensor 25 measures accelerations in three axial directions that are applied to the display controller 20. The gyroscope sensor 26 measures by rotation around the three axes of the display controller 20.

The azimuth sensor 27 measures geomagnetism to determine an azimuth in terms of north, south, east, and west. The gyroscope sensor 26 and the azimuth sensor 27 measure information relating to directions. The former sensor measures a change in direction, and the latter sensor measures the direction itself. Of course, the change in direction can be measured also by the azimuth sensor 27. In addition, on the condition that an initial value of azimuth is determined, the azimuth can be measured by the gyroscope sensor 26. The display image generating unit 28 generates an image to be displayed on the display 11.

A relative position relationship and a directional relationship between the GPS unit 24, the azimuth sensor 27, and the gyroscope sensor 26, and position relationships and directional relationships therebetween in the eyeglass display device 10, are preliminarily determined and are known.

The operation content receiving unit 29 receives various kinds of operations performed by the user 50. The operation is received, e.g., by means of voice sound, by operating a terminal such as a smartphone, or by moving the head in such a manner that the user 50 nods or turns laterally.

In the case of detecting movement of the head of the user 50, the gyroscope sensor 26 detects movement of the head of the user 50. In response to this, the eyeglass display device 10 is operated based on a predetermined correspondence relationship between a movement of the head and an operation content.

For example, the user 50 carries a smartphone 51 in which application software for operating the eyeglass display device 10 is installed, and the eyeglass display device 10 is operated by using the smartphone 51 as an operation terminal. In this example, a signal relating to a content of operation performed to the smartphone 51 is output from the smartphone 51 by using an appropriate communication standard, e.g., Bluetooth (registered trademark) standard, and is received by the operation content receiving unit 29. A tablet or a dedicated operation terminal can also be used instead of the smartphone 51.

In another example, a switch may be disposed on the eyeglass display device 10, and this switch may be operated. In yet another example, the operation of the user 50 may be received through a switch coupled to the eyeglass display device 10 by wireless connection or wired connection.

The camera 30 obtains a moving image in a forward direction of the user 50 in the state in which the user 50 places the eyeglass display device 10 on the head. The moving image that is obtained by the camera 30 is able to be displayed on the display 11. In this embodiment, the camera 30 also functions as a sighting unit. The camera 30 is used to optically sight the TS 60.

Overview of Operation

First, the TS 60 is installed in a surveying site. Exterior orientation parameters (location and attitude) of the TS 60 are measured in advance and are preliminarily obtained as known data. Location data of survey setting points is preliminarily stored in the TS 60.

Herein, the location and the attitude of the TS 60 are preliminarily determined in an absolute coordinate system, and positioning data is measured in the absolute coordinate system. The absolute coordinate system is a coordinate system used in a GNSS or in describing map information, and the coordinates are described in terms of, for example, latitude, longitude, and altitude. Alternatively, a local coordinate system in which a relationship with respect to the absolute coordinate system is known can also be used.

First, the optical axis of the TS 60 is directed to a first survey setting point. The user or the operator 50 understands approximate location of the first survey setting point and approaches the vicinity of the first survey setting point while carrying the surveying pole 70 by hand. Then, the TS 60 is made to capture and lock on the reflection prism 71. After the TS 60 captures and locks on the reflection prism 71, positioning of the reflection prism 71 starts. Data of the positioning, that is, measured location data of the reflection prism 71, is sent from the TS 60 to the eyeglass display device 10 or the display controller 20.

The TS 60 sends location data of the first survey setting point to the eyeglass display device 10, in addition to the location data of the reflection prism 71. Data of survey setting points may be stored in the eyeglass display device 10 in advance.

The eyeglass display device 10 or the display controller 20 displays an image, which will be described later, on the display 11 upon receiving the positioning data of the reflection prism 71. The user 50 places the surveying pole 70 at the first survey setting point by referring to the displayed image.

After the first survey setting point is identified, the user 50 sets a mark of the survey setting point that is identified thereat. At this time, a pile may be driven at the identified survey setting point. The TS 60 maintains the optical axis as it is, although the first survey setting point is identified, and the TS 60 continuously locks on the reflection prism 71.

Next, the user 50 operates the portable smartphone 51 to instruct start of guiding to a next survey setting point, and a signal of this instruction is sent from the smartphone 51 to the TS 60. Upon receiving this instruction, the TS 60 sends location data of a next survey setting point or a second survey setting point and the positioning data of the reflection prism 71 to the eyeglass display device 10.

The eyeglass display device 10 generates an image for guiding the user 50 to the second survey setting point by using the location data of the second survey setting point and the location data of the reflection prism 71 and displays the generated image on the display 11.

Thereafter, processing and work that are the same as those described above are repeated to identify a third survey setting point, a fourth survey setting point, and subsequent survey setting points.

Example of Display Image for Guiding

Figure 4A:
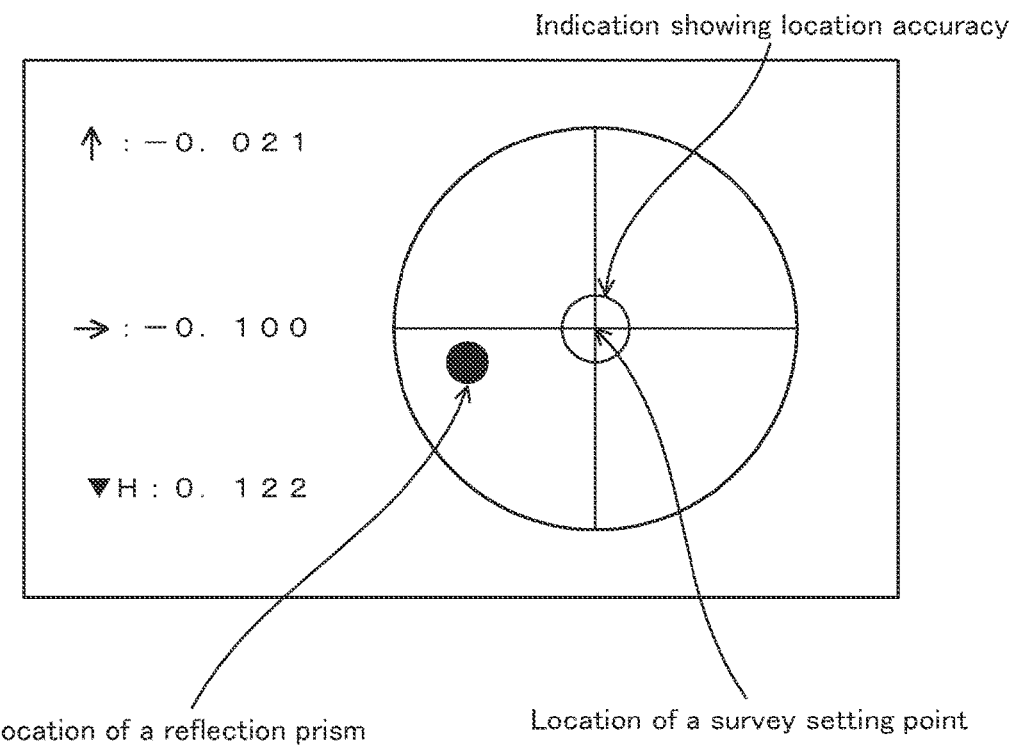
FIGS. 4A and 4B show examples of display images.
Figure 4B:
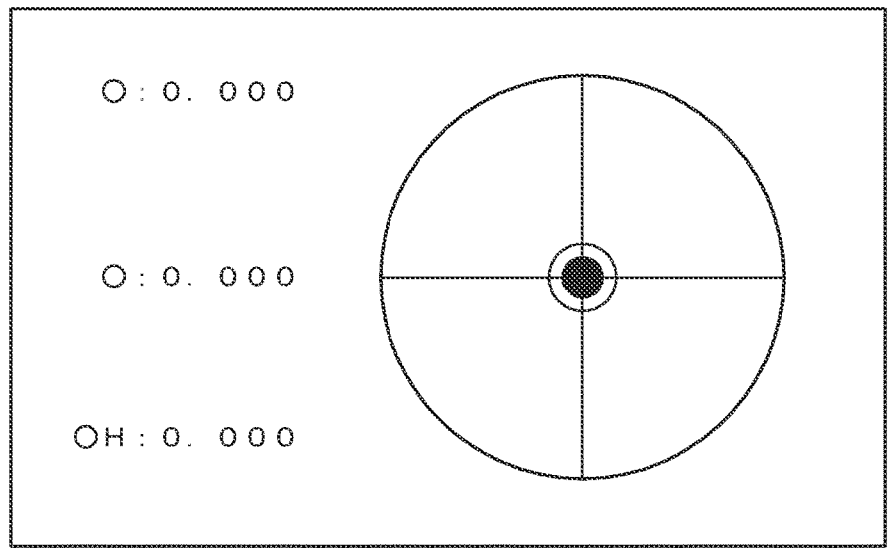

FIGS. 4A and 4B show examples of images displayed on the display 11. These images show a ground surface on which a survey setting point is set, as vertically viewed from above. The images in FIGS. 4A and 4B show a survey setting point at a position of the intersection of the displayed cross in an X-Y direction in terms of the absolute coordinate system or a local coordinate system set in a surveying site and show a location of the reflection prism 71 measured by the TS 60, by the • mark, on the right side.

The images also show distances in the X-Y direction and in the height direction between the reflection prism and the survey setting point in terms of numerical values. FIG. 4A shows a state in which there is some distance in the X-Y direction between the survey setting point and the reflection prism 71.

In this case, the user 50 moves in the X direction and the Y direction to make the location of the reflection prism 71 coincide with the survey setting point after recognizing the distance. FIG. 4B shows an image that is displayed when the location of the reflection prism 71 coincides with the survey setting point.

The coordinate system that is used for displaying the images in FIGS. 4A and 4B can be selected by the user 50. This selection is performed by operating the smartphone 51. Examples of the coordinate system include a local coordinate system set in a surveying site and the absolute coordinate system. The local coordinate system specifies X-Y coordinates that are orthogonal to each other in freely selected directions. The absolute coordinate system is a coordinate system used in a GNSS and specifies X-Y coordinates in an east-west direction and a north-south direction. An example of the absolute coordinate system includes a coordinate system that specifies a positive Y-axis direction in the north direction and a positive X-axis direction in the east direction.

Arithmetic operation relating to displaying the images in FIGS. 4A and 4B is performed by the arithmetic operation unit 23, and the display images are generated by the display image generating unit 28. To display the images in FIGS. 4A and 4B, for example, the following arithmetic operation is performed. As preparation, the location of the survey setting point is determined in a design plan and is already known. The location of the reflection prism 71 is already positioned by the TS 60. These two pieces of location information are plotted on a selected coordinate system, whereby the location relationship between the survey setting point and the reflection prism 71 is quantitatively determined. This processing is performed by the arithmetic operation unit 23.

Then, an image for showing the determined location relationship on the display is generated by the display image generating unit 28, and the generated image is displayed on the display 11. The display images in FIGS. 4A and 4B show circular marks that represent location accuracy required for a survey setting point. The user 50 adjusts the location of the surveying pole 70 so that the • mark, which indicates the location of the reflection prism 71, will enter the circular mark. This accuracy, that is, the diameter of the circular mark, can be changed by the user 50. This operation is performed by using the smartphone 51.

Figure 5:
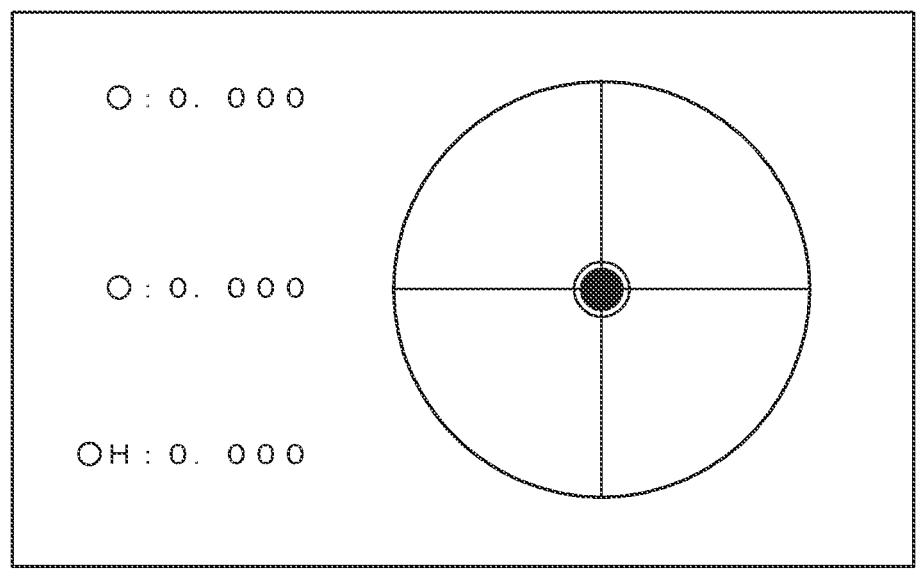
FIG. 5 shows an example of a display image.

FIG. 5 shows an example of a case in which the diameter of the circular mark that represents the accuracy is changed from the states in FIGS. 4A and 4B.

2. Second Embodiment

Figure 3:
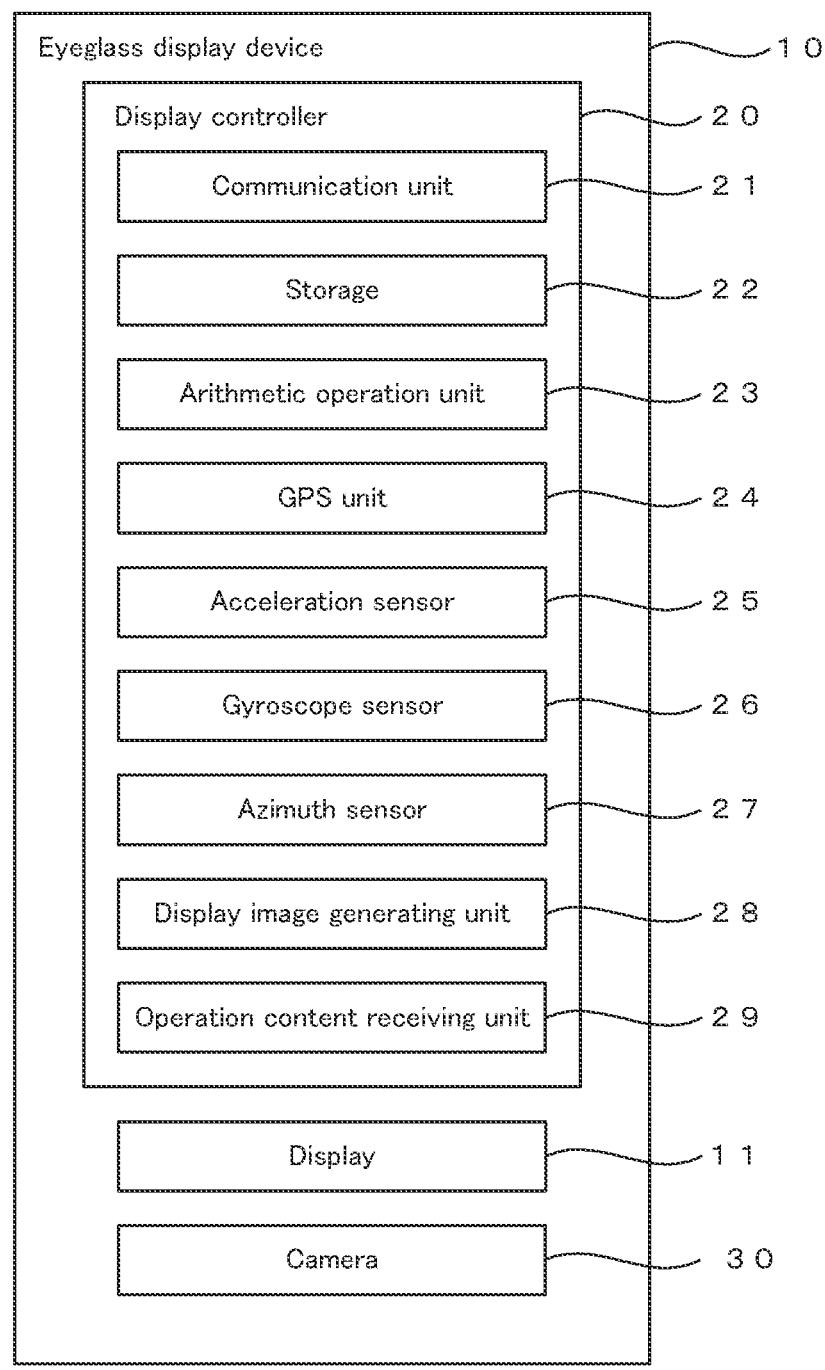
FIG. 3 is a block diagram of the display device of the embodiment.

As shown in FIG. 3, the eyeglass display device 10 includes the GPS unit 24, the acceleration sensor 25, the gyroscope sensor 26, and the azimuth sensor 27. A guide image to be displayed on the display 11 can also be generated by using these components and a highly accurate positioning function of the TS 60. The following describes an example of this case.

In this embodiment, exterior orientation parameters (location and attitude) of the eyeglass display device 10 in the state of being placed on the head of the user 50 are obtained. The eyeglass display device 10 includes the GPS unit 24, the acceleration sensor 25, the gyroscope sensor 26, and the azimuth sensor 27. This eyeglass display device 10 measures the location by using the GPS unit 24 and measures the absolute orientation and a change in direction by using the azimuth sensor 27 and the gyroscope sensor 26, thereby obtaining the exterior orientation parameters. The exterior orientation parameters that are used herein are based on a coordinate system used by the TS 60. Thus, either a local coordinate system or the absolute coordinate system can be used.

In general, an ordinary GPS has a measurement error of meters, an azimuth sensor has a measurement error due to the magnetic declination and surrounding conditions, and the gyroscope sensor 26 can cause drift. In view of this, exterior orientation parameters of the eyeglass display device 10 are calibrated by using the function of the TS 60, in order to maintain high accuracy of the eyeglass display device 10. This processing will be described later.

Figure 6A:
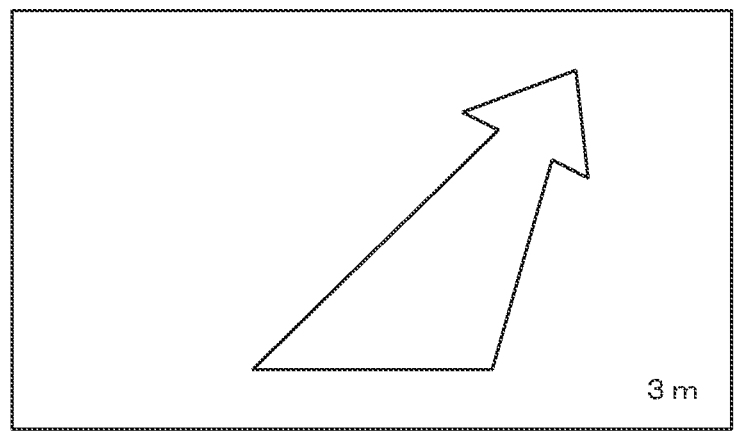
FIGS. 6A to 6C show examples of display images.
Figure 6B:
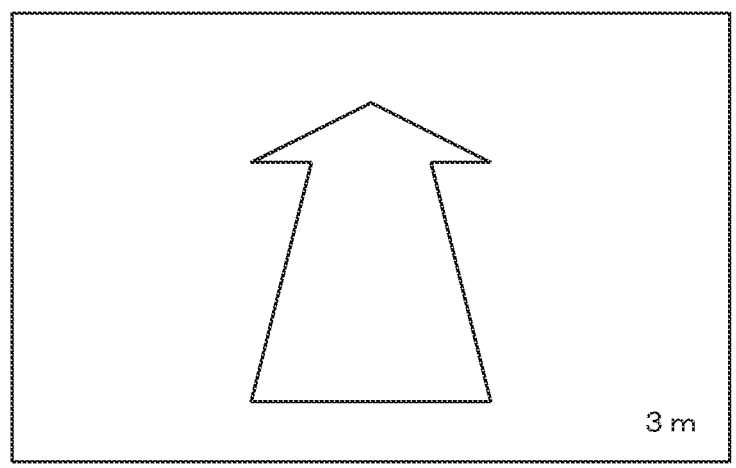
Figure 6C:
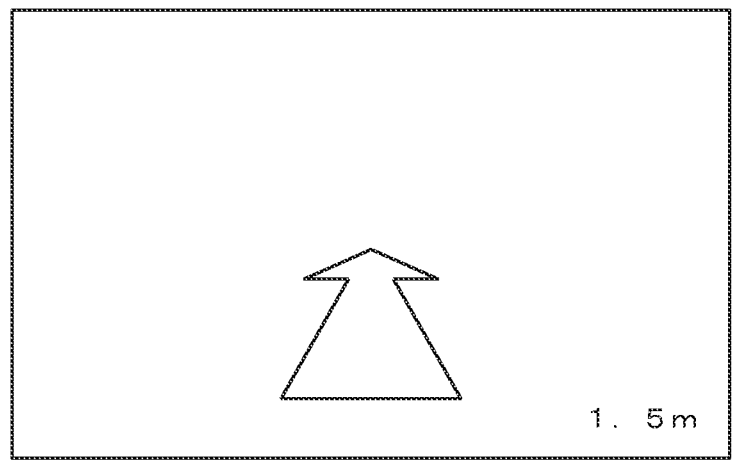

FIGS. 6A to 6C show examples of display images that are obtained by using the TS 60 and the exterior orientation parameters of the eyeglass display device 10. FIG. 6A shows a state in which a survey setting point exists 3 meters ahead in a right oblique direction. When the user 50 turns the head to the right or turns the body to the right from the state in FIG. 6A, the survey setting point comes in front of the user 50. An example of an image displayed on the display 11 in this state is shown in FIG. 6B.

First, arithmetic operation that is performed by the arithmetic operation unit 23 so as to display the image in FIG. 6A is described. In this case, the eyeglass display device 10 acquires the location of the survey setting point and location of the reflection prism 71 from the TS 60. At this stage, the exterior orientation parameters of the eyeglass display device 10 are known. Thus, the location of the eyeglass display device 10 is determined by taking the location of the reflection prism 71 as the location of the eyeglass display device 10, whereby the direction of the survey setting point as viewed from the eyeglass display device 10 is determined. Although the location of the reflection prism 71 differs from the location of the eyeglass display device 10 by several tens of centimeters, this difference is acceptable herein. Moreover, the distance between the location of the survey setting point and the reflection prism 71 is also determined. That is, the direction and the distance of the survey setting point are determined relative to the eyeglass display device 10. The arithmetic operation relating to this processing is performed by the arithmetic operation unit 23.

Then, an image is generated from the direction and the distance of the survey setting point relative to the eyeglass display device 10. The image shows an arrow, as in each of FIGS. 6A to 6C, in an expected field of view of the user 50. This processing is performed by the display image generating unit 28.

For example, it is assumed that a survey setting point exists ahead in a right oblique direction of the user 50. In this case, the direction of the arrow is adjusted in accordance with this direction, and the length and the dimensions of the arrow are also adjusted in accordance with the separated distance, whereby the display image in FIG. 6A is generated.

In the state in which the image in FIG. 6A is displayed on the display 11, an angle θ between the front direction of the eyeglass display device 10 and a line connecting the eyeglass display device 10 and the survey setting point is determined. Thus, when the eyeglass display device 10 is turned to the right in the state in FIG. 6A, the angle θ is gradually decreased in arithmetic operation, and the direction of the displayed arrow is changed accordingly by display control. In short, display control is performed in such a manner that the image in FIG. 6A is changed to the image in FIG. 6B in response to the turn to the right of the user 50 or the eyeglass display device 10.

When the user 50 advances straight forward from the state in FIG. 6, the change in location of the eyeglass display device 10 and the decrease in distance to the survey setting point are measured by the positioning function of the TS 60 or the positioning function of the GPS unit 24 or both. The display image generating unit 28 uses these results to generate the image in FIG. 6C that allows sensitive understanding of the distance to the survey setting point, by shortening the length of the displayed arrow.

The images in FIGS. 6A to 6C may include photographic images obtained by the camera 30. In this case, an image for guiding to a survey setting point in a background view that is viewed by the user 50, is displayed.

Figure 7A:
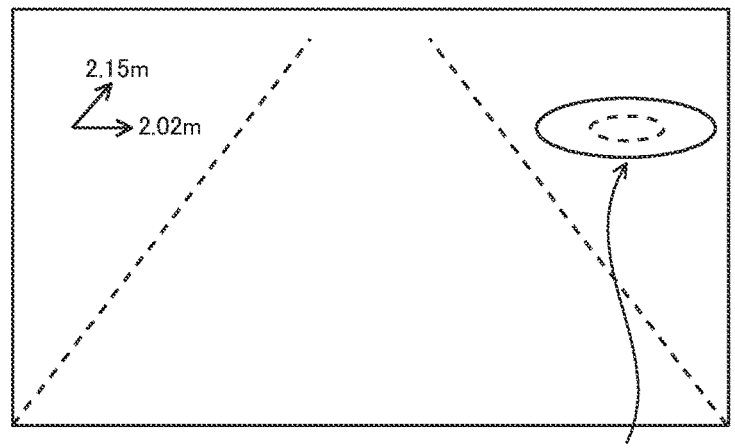
FIGS. 7 to 7C show examples of display images.
Figure 7B:
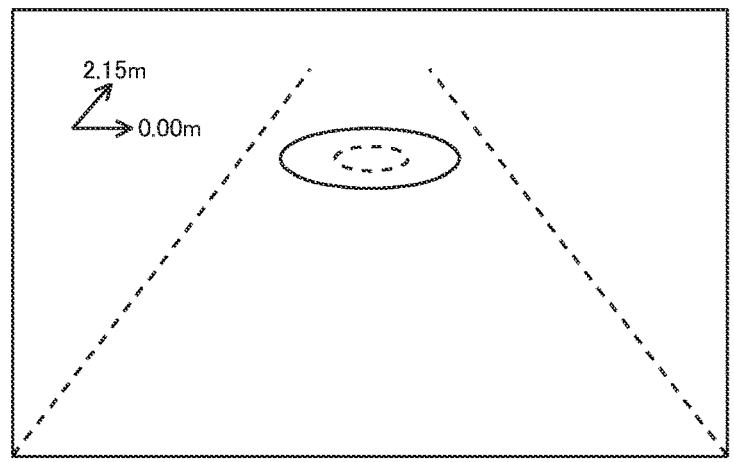
Figure 7C:
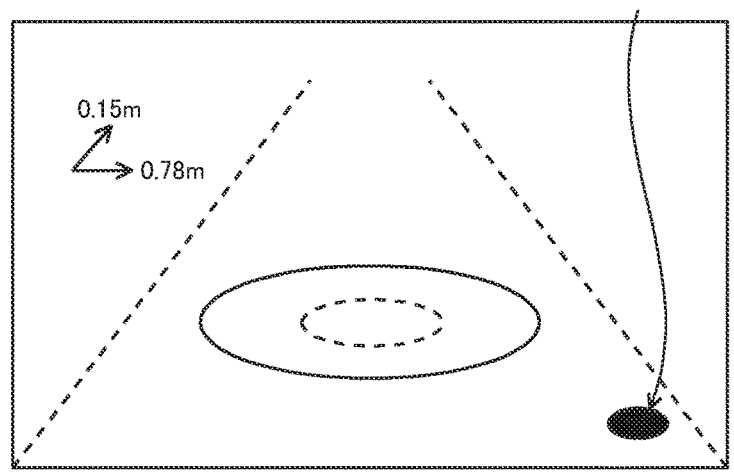

FIGS. 7A to 7C show other examples of the display images displayed on the display 11. In these examples, images for guiding to the survey setting point as viewed from the user 50 are displayed based on the known location of the survey setting point and the exterior orientation parameters of the eyeglass display device 10.

The following describes a method of generating the images in FIGS. 7A to 7C. FIG. 8 shows a principle diagram. Herein, a projection plane as viewed from the viewpoint of the user 50 is set. A 3D image or an oblique-view image is projected on the projection plane, which is then viewed by the user 50.

At this stage, the exterior orientation parameters of the eyeglass display device 10 and the location of the survey setting point are known. In these conditions, the location on the ground surface of the survey setting point is projected on the projection plane, which is generated based on the viewpoint of the user 50, and survey setting point location markers for marking and guiding to the location of the survey setting point are displayed at the projected position. The center of the concentric survey setting point location markers shows the specified location of the survey setting point. The projection plane is virtually set at a position several tens of centimeters in front of the eyes of the user 50. The projection plane shows various kinds of location information on the ground surface as viewed from the viewpoint of the user 50.

For example, it is assumed that a survey setting point Pi, in which location on a ground surface is specified, is set. In this case, a directional line connecting the survey setting point Pi and the viewpoint of the user 50 is set. The directional line intersects a projection plane based on the viewpoint of the user 50, and the point of the intersection on the projection plane is used as a projection point pi of the survey setting point. That is, the user 50 visually recognizes the survey setting point Pi on the ground surface at the point pi on the projection plane set in front of the eyes of the user 50. This processing is performed by the display image generating unit 28. The location on the ground surface of the reflection prism 71 is shown on the projection plane by similar principle.

As described above, the projection plane that is set in front of the eyes of the user 50 based on the user's viewpoint is displayed in the display image of the display 11. A line connecting the viewpoint of the user 50 and the placement planned location of the survey setting point Pi intersects the projection plane, and a placement planned location pi of the survey setting point is shown at a position of the point of the intersection on the projection plane. In a case in which the survey setting point is outside the field of view of the user 50, and thereby cannot be displayed in the image, the direction of the survey setting point is shown by, e.g., an arrow, as in FIG. 6A.

FIG. 7A shows a state in which a survey setting point exists in a right forward direction. When the user 50 turns to the right in the state in FIG. 7A to capture the survey setting point in front of the user 50, the image is changed to the image in FIG. 7B. Then, when the user 50 advances forward, survey setting point location markers for showing the location of the survey setting point move to the front of the user 50 in the image, and the image is changed to the image in FIG. 7C.

FIG. 7C shows an X-Y location or a horizontal plane location of the reflection prism 71 by a • mark. This facilitates understanding of the location relationship between the survey setting point and the reflection prism 71. In this case, X-Y axes are specified in such a manner that the front direction is a positive X direction and the right direction is a positive Y direction relative to the user 50.

In the case of displaying the image as in each of FIGS. 6A to 6C and 7A to 7C, an image as viewed from the viewpoint of the user 50, that is, an image using the user 50 as a reference location, is displayed on the display 11, and the content of this image is changed in real time in response to rotation and travel of the user 50. This image has a content as viewed from the viewpoint of the user 50, and therefore, the direction and the distance to the survey setting point as viewed from the user 50 are easy to intuitively understand, and a highly convenient guiding function is obtained.

GPS information may be obtained by using a GPS function that is provided to the smartphone 51 carried by the user 50.

Although the location of the reflection prism 71 is taken as the location of the eyeglass display device 10 in the foregoing examples, the location difference therebetween can be set in advance as an offset value or a correction value. For example, it is assumed that the user 50 tries to maintain holding the measuring pole 70 so that the reflection prism 71 will be at a position offset from the head of the user 50 by 30 cm in the right direction, 25 cm in the forward direction, and 5 cm in the downward direction. In this case, the location of the eyeglass display device 10 is corrected to a location (X+25 cm, Y+30 cm, Z−5 cm) relative to a measured location (X, Y, Z) of the reflection prism 71. This reduces generation of a measurement error due to the location difference between the reflection prism 71 and the eyeglass display device 10.

Calibration Processing of Exterior Orientation Parameters of Eyeglass Display Device 10

The following describes calibration processing of exterior orientation parameters of the eyeglass display device 10. In this processing, while the TS 60 locks on the reflection prism 71 and positions the reflection prism 71, the user 50 takes a photographic image of the TS 60 by using the camera 30 of the eyeglass display device 10 that is placed on the head of the user 50. At this time, the user 50 should bring the reflection prism 71 as close to the eyeglass display device 10 as possible.

The photographic image that is obtained by the camera 30 is displayed on the display 11, and the user 50 sights or collimates with respect to the TS 60 by viewing the displayed image. At this time, the user 50 should try to capture the TS 60 at the center of the photographic image. In addition, a reticle, such as crosshairs, may be shown in the image on the display 11 to allow precise sighting. This processing uses the camera 30 as a sighting unit.

The following calibration processing starts in response to the sighting. After this processing starts, the eyeglass display device 10 receives positioning data of the reflection prism 71, which is obtained by the TS 60. Then, positioning data that is obtained by the GPS unit 24 is calibrated by using the location data of the reflection prism 71.

In this state, the camera 30 sights the TS 60, the optical axis of the eyeglass display device 10 or the camera 30 is directed to the TS 60, and the optical axis of the TS 60 is directed to the reflection prism 71.

The optical origin of the eyeglass display device 10 is set at the position of a projection origin or a viewpoint of the user 50. Normally, the position of the viewpoint or the projection origin of a user is set as a design parameter of the eyeglass display device 10 by using a standard head model as the head of a future user. This set position is used as the optical origin of the eyeglass display device 10.

The direction of the optical axis of the camera 30, that is, the direction (attitude) of the eyeglass display device 10 is determined based on data of the direction of the optical axis of the TS 60. For example, in a case in which the optical axis of the TS 60 is directed to an azimuth of 90 degrees, the optical axis of the camera 30 is directed to an azimuth of 270 degrees. The processing for calculating the direction (attitude) of the eyeglass display device 10 is performed by the arithmetic operation unit 23.

Then, this direction data of the eyeglass display device 10, which is obtained by using the TS 60, is used to calibrate the gyroscope sensor 26 and the azimuth sensor 27.

Thus, the positioning data that is obtained by the GPS unit 24 and the data of directions measured by the gyroscope sensor 26 and the azimuth sensor 27, are calibrated. The calibration is intermittently performed to maintain accuracy of the positioning data obtained by the GPS unit 24 and the data of directions measured by the gyroscope sensor 26 and the azimuth sensor 27.

The calibration can also be performed even when the camera 30 is not provided or is not used. In this case, the structure is configured to allow disposition of a sighting unit for performing sighting by eye, in front of the eyeglass part 12. This sighting unit is used to sight the TS 60.

The calibration processing is substantially equivalent to calculation of exterior orientation parameters and can thereby be understood as calculation processing of the exterior orientation parameters of the eyeglass display device 10. The calibration and the calculation of the exterior orientation parameters described herein may be performed at the same time, or only one of them may be performed.

3. Third Embodiment

One or more of the positioning function of the TS 60, the positioning function of the GPS unit 24, and the acceleration measuring function of the acceleration sensor 25 may be used to determine whether the user 50, who places the eyeglass display device 10 on the head, is traveling, and displaying an image on the display 11 may be stopped while the user 50 is traveling. In this case, displaying an image resumes when a specific time elapses after the user 50 stops traveling and stands still. Using this function prevents the user 50 from focusing on the content displayed on the display 11 and having trouble such as stumbling on a step or a stone while traveling.

4. Fourth Embodiment

The movement of the head of the user 50, who places the eyeglass display device 10 on the head, may be measured by the acceleration sensor 25 or the gyroscope sensor 26 or both, and this result may be used to perform at least one operation of the eyeglass display device 10.

In one example, in order to obtain safety and reduce consumption of power, the image on the display 11 may be deleted when a specific time elapses after movement of the head of the user 50 stops, and displaying an image on the display 11 may resume in response to detection of movement of the head of the user 50.

5. Fifth Embodiment

When the user 50 holding the measuring pole 70 suddenly moves quickly in the state in which the TS 60 locks on the reflection prism 71, locking may be released, and the TS 60 may lose the reflection prism 71. In such a case, the reflection prism 71 is searched for by a target searching function of the TS 60. However, this search can be more quickly performed by sending a signal for assisting the search, from the eyeglass display device 10.

In a first specific example, information of location of the eyeglass display device 10 that is measured by the GPS unit 24 is sent to the TS 60 as the assist signal. In this example, the TS 60 recognizes the location of the eyeglass display device 10 relative to itself and calculates the direction of the eyeglass display device 10, thereby narrowing down an area for searching for the reflection prism 71. This increases the searching efficiency of the reflection prism 71.

In a second specific example, information of the direction of the optical axis in the front direction of the eyeglass display device 10 is sent to the TS 60 as the assist signal. In this example, the user 50 who places the eyeglass display device 10 on the head turns the head or the body to view the TS 60 in front of the user 50. At this stage, the direction of the optical axis in the front direction of the eyeglass display device 10 is measured based on information that is measured by the gyroscope sensor 26 and the azimuth sensor 27, and the measured information of the direction is sent from the communication unit 21 to the TS 60.

As a result, the TS 60 recognizes the direction from the eyeglass display device 10 or the user 50 to the TS 60. In this state, the TS 60 and the eyeglass display device 10 use the same coordinate system due to the calibration processing described above. Thus, when the TS 60 recognizes the direction from the eyeglass display device 10 or the user 50 to the TS 60, the direction of the eyeglass display device 10 or the user 50 as viewed from the TS 60 is determined.

The user 50 holds the measuring pole 70 that is mounted with the reflection prism 71. Thus, when the direction of the eyeglass display device 10 or the user 50 as viewed from the TS 60 is determined, the direction of the reflection prism 71 as viewed from the TS 60 is also determined. This enables the TS 60 to narrow down the area for searching for the reflection prism 71.

The assist signal in the first specific example and the assist signal in the second specific example may be used together. When the user 50 who placed the eyeglass display device 10 on the head views the TS 60 in the front direction, a photographic image that is obtained by the camera 30 may be used. In this case, the photographic image is displayed on the display 11, and the user 50 views the displayed photographic image to sight the TS 60. This work uses the camera 30 as a sighting unit.

6. Sixth Embodiment

The direction of the face of the user 50 may be measured, and the content in an image displayed on the display 11 may be changed based on this measured direction. For example, the image in each of FIGS. 6A to 6C or FIGS. 7A to 7C is displayed when the user 50 who placed the eyeglass display device 10 on the head views a distant surface ground part at a distance of 1 meter or more, and the image in FIG. 4A or 4B or FIG. 5 is displayed when the user 50 views a close ground surface part at a distance of less than 1 meter.

In this operation, in one example, when a user 50 having eyes at a height of 1.7 meters raises the face to view a distant part at a distance of 1 meter or more, an angle relative to the horizontal direction in the front direction of the face in this state is measured by the gyroscope sensor 26. For example, this angle is in a range of a depression angle of −60 degrees to an elevation angle of +30 degrees. On the basis of the measured angle, displaying of the image in each of FIGS. 6A to 6C or FIGS. 7A to 7C is controlled. In another example, when the user 50 lowers the face so as to view a close part at a distance of less than 1 meter, an angle relative to the horizontal direction in the front direction of the face in this state is measured by the gyroscope sensor 26. For example, this angle is a depression angle from −60 degrees to −90 degrees. On the basis of the measured angle, displaying of the image in FIG. 4A or 4B or FIG. 5 is controlled.

When the user 50 is distant from the survey setting point, the 3D image as viewed from the user's viewpoint in the oblique upward direction to the ground surface, as in each of FIGS. 6A to 6C and FIGS. 7A to 7C, is easier to visually understand the direction and the distance to the survey setting point. On the other hand, when the user 50 comes close to the survey setting point, the display image as viewed from a viewpoint in the upward vertical direction, as in FIG. 4A or 4B or FIG. 5, is easier to perform location coinciding more precisely. In these operations, the two kinds of the images are switched in accordance with the direction of the face corresponding to the line of sight of the user 50.

That is, when the user 50 views a relatively distant part, the user 50 raises the face, and this is measured, whereby the 3D image that is appropriate for this case, as in each of FIGS. 6A to 6C or FIGS. 7A to 7C, is displayed. On the other hand, when the user 50 views a relatively close part, the user 50 faces downward, and this is measured, whereby the flat plane image as viewed from a viewpoint in the upward vertical direction, as in FIG. 4A or 4B or FIG. 5, is displayed. Switching of the displayed images is automatically performed in accordance with the direction of the face, thereby not interrupting the work of the user 50 in the work for setting a survey setting point. Moreover, this control corresponds to the direction of the natural line of sight, thereby not making the line of sight of the user 50 wander.

As described above, in this embodiment, change in the direction of the face of the user 50 or the direction of the eyeglass display device 10 is measured by the gyroscope sensor 26. Then, when the optical axis in the front direction of the eyeglass display device 10 is directed to a relatively distant ground surface, the image as viewed from the viewpoint of the user 50 in an oblique upward direction to the ground surface at a place at which the survey setting point is set, is selected and displayed on the display 11. On the other hand, when the optical axis in the front direction of the eyeglass display device 10 is directed to a relatively close ground surface, the image as viewed from a viewpoint in the upward vertical direction to the ground surface is selected and displayed on the display 11.

Although the examples of the case of setting the survey setting point on a ground surface or a ground are described, a survey setting point may be set on a floor surface in a building. In this case, the floor surface is used instead of the ground surface. This also applies to the other embodiments.

Other Matters

Positioning information of the reflection prism 71 may be provided to the eyeglass display device 10 by a device other than the TS 60. For example, a control computer for controlling the TS 60 may be prepared separately from the TS 60, positioning information of the TS 60 may be input to the control computer, and this positioning information may be sent from the control computer to the eyeglass display device 10.

Although the examples using the reflection prism as a target are described, any object or any member that efficiently reflects light can be used as a target to be positioned by the TS. Examples of such a target include a mirror with a spherical shape and a mirror with a cylindrical shape.

A reflection prism may be disposed on the eyeglass display device 10, and the TS 60 may position the eyeglass display device 10 by using this reflection prism as a target. In this case, the position of the reflection prism on the eyeglass display device 10 is preliminarily determined, and offset parameters relative to the optical origin of the eyeglass display device 10 are obtained in advance.

This reflection prism is positioned in the state in which the reflection prism 71 is covered in order not to make the reflection prism 71 reflect light. In addition, a member having an optical characteristic for attenuating or blocking distance measuring light from the TS 60 may be used as the eyeglass part 12 to protect the eyes of the user 50. Alternatively, a reflection prism may be mounted on a hardhat or a cap worn by the user 50.

The invention disclosed in this specification can be used in each kind of surveying performed in, e.g., a civil engineering site or marking work at a construction site. Moreover, the present invention can be used in determination of location in, e.g., measurement of illuminance, wind velocity, pressure, electric field intensity, trace amounts of elements, foreign matter, or other parameter, water quality inspection, or visual inspection of a construction, cliff, slope, or a concrete surface.

OTHER ASPECTS

The invention disclosed in this specification can also be understood as an invention of a method and an invention of a program.

What is claimed is:

1. A location information display device comprising:
a receiving unit that receives positioning information of a target positioned by a location measuring device by using laser light;
a display unit configured to be placed on the head of a user and to be viewed by the user; and
a sensor that measures information relating to direction, the display unit further configured to display a first image showing a location of the target that is viewed by the user from a vertical upward direction of the target on a ground surface, and to display a second image showing a location of the target that is viewed by the user from an oblique upward direction of the target on the ground surface, wherein movement of the head of the user is measured by the sensor, and the first image and the second image are switched in accordance with movement of the head.

* * * * *